Nov. 20, 1962     O. J. B. ORWIN     3,064,796
PULLEYS, ROLLERS AND OTHER WHEEL-LIKE MEMBERS
Filed March 2, 1960     2 Sheets—Sheet 1
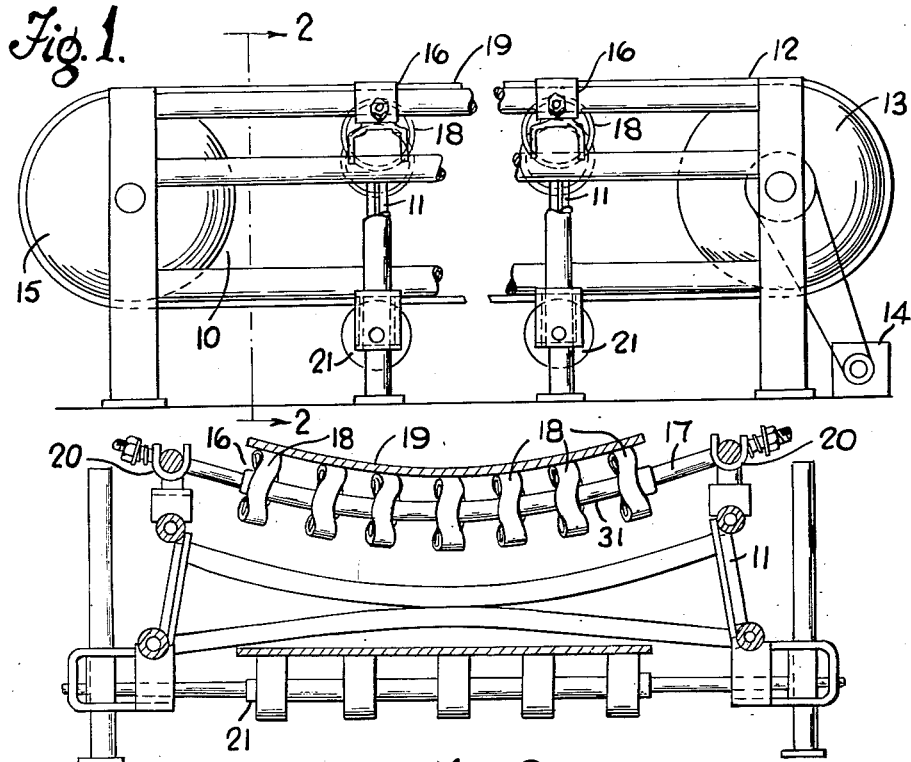
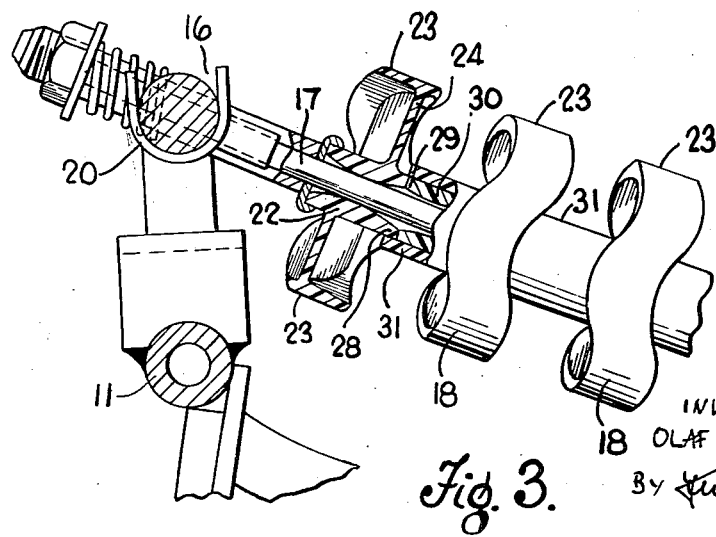
INVENTOR
OLAF J.B. ORWIN Nov. 20, 1962 O. J. B. ORWIN 3,064,796
PULLEYS, ROLLERS AND OTHER WHEEL-LIKE MEMBERS
Filed March 2, 1960 2 Sheets-Sheet 2
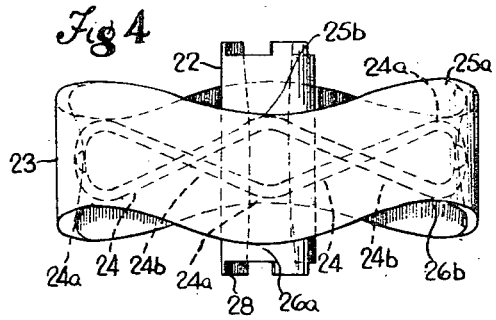
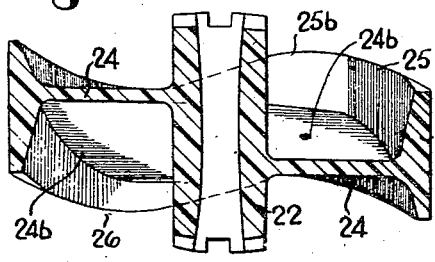
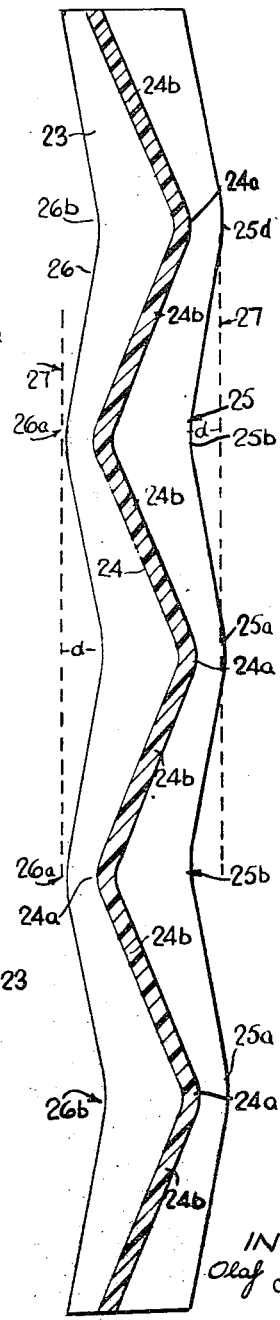
INVENTOR
Olaf John Barclay Orwin
BY
AGENT United States Patent Office 3,064,796
Patented Nov. 20, 1962

3,064,796
PULLEYS, ROLLERS AND OTHER WHEEL-LIKE MEMBERS
Olaf J. B. Orwin, Quinton, Birmingham, England, assignor to Fisher & Ludlow Limited, Birmingham, England, a British company
Filed Mar. 2, 1960, Ser. No. 12,459
Claims priority, application Great Britain Mar. 5, 1959
4 Claims. (Cl. 198—192)

This invention relates to pulleys, rollers, and other wheel-like members, hereinafter referred to and included in the generic expression "roller," and is concerned with that kind of roller which comprises a peripheral tread connected to a central hub through the medium of a connecting web.

The invention has been developed in connection with rollers for supporting belts of endless belt conveyors, including endless belt conveyors adapted for the conveyance of material in bulk form in which the load carrying run of the belt is of trough configuration, but the invention is considered to be applicable to rollers and pulleys for supporting belts in instances other than endless belt conveyors, for example, rollers or pulleys in belt drives.

One particular application of the invention is to the construction of disc-like rollers of idler roller assemblies for use in supporting in trough configuration the load carrying run of an endless conveyor belt, which disc-like rollers may, for example, be mounted for rotation upon a resilient supporting shaft.

Insofar as the present invention is concerned with a new or improved construction of web for connecting the roller tread to the central hub, the invention, insofar as it embodies a new or improved construction of web, hereinafter more particularly described, is considered to be applicable to track or ground engaging wheels, for example, wheels of wheel trucks and castor wheels which, as in the case of rollers for supporting belts, are liable to be subjected to a substantial load acting transversely of the axis of rotation of the wheel, which expression, as earlier explained, is embraced within the generic expression "roller."

The present invention has for its primary object the provision of a new or improved form of belt supporting roller which is particularly economical in material forming the roller, which roller permits of a certain reduction in belt wear as compared with rollers of existing form.

A further object of the present invention is to provide a construction which facilitates re-engagement between a roller and an endless belt in the event of the belt wandering relative to the roller.

A further object of the present invention is to provide a construction in which the roller tread is believed to perform a cleaning effect on the underside of the belt.

Still a further object of the present invention is the provision of a roller which is of a particularly rigid construction, and which is especially well adapted to withstand crushing or distortion under a load applied to the rim acting transversely of the axis of rotation of the roller, and which is particularly applicable to rollers of wheel-like construction for use as track or ground engaging wheels as above described.

The invention is illustrated in the accompanying drawings wherein:

FIGURE 1 illustrates in diagrammatic form in side elevation one form of endless belt conveyor provided with belt supporting rollers in accordance with the present invention.

FIGURE 2 is a sectional view on the line 2—2 of FIGURE 1, illustrating one of the idler roller assemblies employed for supporting the endless belt and embodying belt supporting rollers in accordance with this invention.

FIGURE 3 is a part sectional view to an enlarged scale of part of the construction depicted in FIGURE 2.

FIGURES 4 and 5 are respectively side elevations and cross sectional views to a further enlarged scale of one of the belt supporting rollers depicted in FIGURE 3.

FIGURE 6 is a diagrammatic view illustrating the development in a flat plane of the tread of the roller illustrated in FIGURE 4.

Referring to the drawings, the endless belt conveyor depicted in diagrammatic form in FIGURE 1 comprises a base frame 10 carrying a number of idler roller assemblies 11 spaced apart in the known manner along the length of the conveyor, the conveyor further embodying an endless belt 12 which passes around driving pulley 13, driven from electric motor or other power unit 14, the belt further passing around a return run pulley 15.

Each idler roller assembly 11 comprises an operative or upper belt run roller structure 16 consisting of a shaft 17 of bowed configuration, on which is rotatably mounted a number of rollers 18 which are adapted to support in trough configuration the upper run 19 of the belt 12. Preferably the shaft 17 is formed as a length of resilient metal bar or tube which extends continuously between its end supports 20, the arrangement being such that the plane of bowing of the bar or tube is vertical, i.e. perpendicular to the length of the adjacent part of the belt 12.

Each idler roller assembly 11 further comprises a return run roller structure 21 for supporting the lower or return run of the belt and this forms no part of the present invention.

Each of the rollers 18 which supports the upper or operative run 19 of the belt comprises a hub 22 which, as shown, is in direct rotatable bearing engagement with the roller shaft 17, although if desired the hub bore may be provided with some form of anti-friction bearing liner.

Each roller 18 further comprises a cylindrical tread 23 connected to the hub 22 through the medium of a web 24.

Preferably, as shown, each roller 18 is formed as a one-piece member, for example as a metal die-casting or as a moulding in a suitable plastic, the arrangement in either case being such that the thickness of the material forming the tread 23 and web 24 is small in comparison with the overall axial dimension of the roller.

In accordance with the present invention the tread 23 of each roller 18 is of wave-like form in a direction circumferentially of the roller, this wave-like configuration being clearly shown in the figures illustrating the construction of the roller, namely FIGURES 4 and 5, and being further shown in the development into a flat plane of the roller tread as shown in FIGURE 6.

The arrangement is such that successive circumferential edge portions 25, 26, of the roller are disposed at different axial positions in relation to a plane perpendicular to the axis of rotation of the roller and passing through the tread 23.

At the same time, as clearly shown in FIGURES 4, 5, and 6, the axial overall thickness of the tread 23 is the same at all circumferential positions thereof.

Preferably, as in the arrangement illustrated, the pitch of each tread wave is one third of the circumferential length of the tread, i.e. each of the two axially directed edge portions 25, 26, of the tread embody the three wave crests 25a, 26a, respectively, and three wave troughs 25b, 26b, respectively, with the respective crests and troughs spaced equidistantly apart in a circumferential direction.

The depth of each trough 25b, 26b, as measured in an axial direction, i.e. the distance $d$ in FIGURE 6, is of the order of one third of the width of the tread as measured in an axial direction so that the overall axial dimension of the tread as measured between the two parallel dotted lines 27 in FIGURE 6 is preferably, in the arrangement shown, approximately one and one-third times the axial width of the tread material as measured in any circumferential position around the tread.

In accordance with a further feature of this invention the web 24 of each roller 18 is of corrugated configuration with the crests 24a of the corrugations spaced circumferentially around the axis of rotation of the roller, the arrangement being such that the web at positions intermediate each of the crests 24a, as clearly shown in FIGURES 4 and 6, extends in directions which are inclined to a diametrical plane passing through the web and extending perpendicular to the axis of rotation of the roller.

As is clearly shown in FIGURE 6, the web at positions between each pair of crests 24a on one or the other of the two sides thereof is of wide V-configuration, i.e. intermediate each pair of crests 24a the web is of substantially straight configuration where indicated at 24b in FIGURE 6, each straight portion extending at an angle of approximately 20° to 30° in one or the other direction to a diametrical plane extending medially through the roller, i.e. perpendicular to the axis of rotation thereof.

The pitch of the crests 24a of the corrugations at either side of the web 24 as measured in any circumferential plane is in the arrangement illustrated one third of the total length of such circumferential plane, and each of the straight portions 24b of the web 24 is, as best shown in FIGURE 6, inclined in the same sense to the diametrical plane aforementioned as the inclination of the adjacent edges 25, 26, of the tread 23, with each web crest 24a being disposed in the same radial plane containing the axis of rotation of the roller as each tread crest 25a, 26a.

Thus, as will be apparent from FIGURE 6, the corrugations of the web roughly conform to the wave-like configuration of the tread 23 and adjacent each tread crest 25a, 26a, the axial distance between the edges 25, 26, of the tread and the adjacent part of the web, namely 24a, is substantially smaller than, i.e. approximately one quarter of the overall axial thickness of the tread.

Thus the tread adjacent each of its crests where it can be expected to be subjected to the maximum local pressure from the adjacent belt is supported efficiently by the close proximity of the adjacent crest 24a of the web; while at positions where the stress induced in the tread by the belt may be expected to be at a minimum, namely adjacent each of the troughs 25b, 26b, their greater, i.e. maximum axial distance from the adjacent part of the web does not thereby undesirably weaken the support provided by the web for the tread.

Thus the corrugated web 24 extends in a manner which is substantially symmetrical insofar as the loading of the tread is concerned so that this is supported through the web from the sub 22 in a particularly efficient manner.

Furthermore, in sofar as the web is of corrugated configuration, this is particularly well adapted to resist crushing or buckling of the tread under the applied load acting in a direction which is radial or substantially radial in relation to the axis of rotation of the roller.

Each end of each of the roller hubs 22 is formed with circumferentially spaced axially directed dogs 28. The dogs of axially adjacent rollers may inter-engage with one another. Alternatively, as shown in FIGURE 3, the mutually opposed dogs 28 of axially adjacent rollers may engage with corresponding dogs 29 on opposed ends of a connecting bush 30, the arrangement in either case being that the several rollers are thereby constrained to rotate together, i.e. at the same rotational velocity, and the so connected parts are enclosed by flexible sleeves 31 which serve to exclude dust and dirt from the bearing surface between each roller 18 and the shaft 17 upon which it is mounted.

By constructing the tread of the roller to wave-like form as above described, the overall width of the tread measured in an axial direction, that is to say, the overall axial distance between the crests of the wave-like edges of the tread, will be greater than the actual axial width of the tread at any particular circumferential position thereon and accordingly for a given width of belt engaged by the roller during the continued advancement of the belt the actual amount of material used in the tread, as measured in a direction axially of the roller tread, will be less than if the tread were of plain cylindrical configuration having an axial width equal to the overall axial width of the wave-like tread in accordance with this invention, so that an important economy in the material employed in the manufacture of the roller is effected.

A further advantage of the present invention is that it enables some reduction in belt wear to be effected. This arises from the fact that the width of belt which is in contact with each roller corresponds to the overall axial distance between the crests of the wave-like edges of the roller tread, which distance is greater than the axial width of the tread. It follows, therefore, that the loading between the underside of the belt and the tread of any partcular roller will be distributed over a belt width corresponding to said overall axial distance, i.e. over a belt width which is greater than the actual axial width of the tread. Thus, as compared with a plain cylindrical tread of the same width as the axial width of the tread of the present invention and for the same belt pressure on the tread, it can be expected that there will be some saving in belt wear.

A further advantage of a roller embodying a tread in accordance with the present invention is that the edges of the tread waves which are inclined to the direction of belt advancement are believed, by virtue of this inclination, to perform a cleaning effect on the adjacent part of the underside of the belt.

Still a further advantage is that in the event of the belt wandering, i.e. moving laterally relative to its supporting rollers during its continued advancement to the extent that a lateral edge of the belt becomes disengaged from an adjacent continually rotating roller, on return lateral movement of the belt occurring consequent on the continued wandering movement aforementioned, the re-engagement of the edge portion of the belt by such roller is assisted by the wave-like configuration of the adjacent tread edge which has a self-lifting effect tending to lift the adjacent edge of the belt back on to the roller again, such self-lifting effect arising from the inclination to the plane of rotation of the roller of the edges 25, 26 of each roller arising from the wave-like configuration of the roller tread at positions intermediate the crest and troughs of each wave. Such inclined edge is adapted to have wedging engagement with the said lateral edge of the belt so that as the roller continues to rotate the lateral edge may be subjected to an increasing wedging pressure operating to lift the edge of the belt in a direction away from the roller shaft 31 until the underside of the belt is aligned with the outer surface of the roller tread 23. Accordingly, re-engagement of each edge portion of the belt with an adjacent roller under the circumstances aforementioned is facilitated by the present invention and is believed in consequence to result in less danger of the edge of the belt becoming chafed than is the case where the edge of the belt under the circumstances aforementioned re-engages with the roller having a plain cylindrical tread.

As applied to an idler roller assembly for use in endless belt conveyors, to which, as already explained, the present invention is particularly applicable, and involving a number of axially spaced rollers, each having treads in accordance with the present invention, the realisation of this last mentioned advantage is ensured as above described by connecting together the hubs of axially adjacent rollers in such a manner that each of the rollers, including the endmost rollers of the assembly, are constrained to rotate together, thereby ensuring that the endmost roller which may have been disengaged by the adpacent edge of the belt in the manner aforementioned, continues to rotate and is consequently still able to exert its belt lifting and thus re-engaging action when the belt again commences to wander in the opposite direction towards its original or mean position.

What I claim is:

1. An idler roller assembly for supporting in trough configuration the load carrying run of an endless belt conveyor, said idler roller assembly comprising a shaft of bowed configuration on which is mounted a number of axially spaced belt supporting rollers, wherein each of the belt supporting rollers comprise a peripheral tread connected to a central hub through the medium of a connecting web, the tread of the roller being of wave-like form in a direction circumferentially of the roller so that successive circumferential edge portions thereof are disposed at different axial positions in relation to a plane perpendicular to the axis of rotation of the roller passing through the tread, and means connecting together the hubs of axially adjacent rollers so that the rollers are constrained to rotate at a common velocity about the roller supporting shaft.

2. An idler roller assembly for supporting in trough configuration the load carrying run of an endless belt conveyor, said idler roller assembly comprising a shaft of bowed configuration on which is mounted a number of axially spaced belt supporting rollers, wherein each of the belt supporting rollers comprises a peripheral tread, a central hub, a web connecting the tread to the hub, said web being formed to corrugated configuration with the crests of the corrugations being spaced circumferentially around the axis of rotation of the roller, such that the web extends in directions which are inclined to a plane which is radial with respect to the axis of rotation of the roller and said roller tread being of wave-like form in a direction circumferentially of the roller so that successive circumferential edge portions thereof are disposed at different axial positions in relation to a plane perpendicular to the axis of rotation of the roller passing through the tread, the crests of the corrugations of the web adjacent each side thereof being disposed in the same radial plane containing the axis of rotation of the roller as the crest of each tread wave at the same axial side of the roller, and means connecting together the hubs of axially adjacent rollers so that the rollers are constrained to rotate at a common velocity about the roller supporting shaft.

3. An idler roller assembly for supporting the load carrying run of an endless belt conveyor, said idler roller assembly comprising a shaft on which is mounted a number of axially spaced belt supporting rollers, wherein each of the belt supporting rollers comprise a peripheral tread connected to a central hub through the medium of a connecting web, and the tread of the roller being of wave-like form in a direction circumferentially of the roller so that successive circumferential edge portions thereof are disposed at different axial positions in relation to a plane perpendicular to the axis of rotation of the roller passing through the tread.

4. An idler roller assembly for supporting the load carrying run of an endless belt conveyor, said idler roller assembly comprising a shaft on which is mounted a number of axially spaced belt supporting rollers, wherein each of the belt supporting rollers comprise a peripheral tread, a central hub, a web connecting the tread to the hub, said web being formed to corrugated configuration with the crests of the corrugations being spaced circumferentially around the axis of rotation of the roller, such that the web extends in directions which are inclined to a plane which is radial with respect to the axis of rotation of the roller and said roller tread being of wave-like form in a direction circumferentially of the roller so that successive circumferential edge portions thereof are disposed at different axial positions in relation to a plane perpendicular to the axis of rotation of the roller passing through the tread, and the crests of the corrugations of the web adjacent each side thereof being disposed in the same radial plane containing the axis of rotation of the roller as the crest of each tread wave at the same axial side of the roller.

References Cited in the file of this patent

UNITED STATES PATENTS

| | | |
|---|---|---|
| 907,991 | Goodfellow | Dec. 29, 1908 |
| 2,042,754 | Winkler | June 2, 1936 |
| 2,698,077 | Baechli | Dec. 28, 1954 |
| 2,698,769 | Powell | Jan. 4, 1955 |
| 2,837,202 | Baechli | June 3, 1958 |
| 2,878,074 | Cawl | Mar. 17, 1959 |
| 2,942,721 | Kidd et al. | June 28, 1960 |